United States Patent [19]
Weddendorf

[11] Patent Number: 5,393,588
[45] Date of Patent: Feb. 28, 1995

[54] SANDWICHED STRUCTURAL PANEL HAVING A BI-DIRECTIONAL CORE STRUCTURE

[75] Inventor: Bruce Weddendorf, Decatur, Ala.

[73] Assignee: The United States of America as represented by the Administrator of the National Aeronautics and Space Administration, Washington, D.C.

[21] Appl. No.: 2,002

[22] Filed: Jan. 8, 1993

[51] Int. Cl.6 .......................... B32B 1/00; E04C 2/36
[52] U.S. Cl. .................................... 428/175; 428/120; 428/178; 428/184; 428/212; 428/225; 428/226; 52/797; 52/800; 52/807
[58] Field of Search ............... 428/182, 184, 178, 120, 428/99, 105, 175, 192, 212, 222, 223, 225, 226, 332, 399; 52/795, 797, 800, 806, 807

[56] References Cited

U.S. PATENT DOCUMENTS

| | | | |
|---|---|---|---|
| 4,034,135 | 7/1977 | Passmore | 428/184 |
| 5,028,474 | 7/1991 | Czaplicki | 428/184 |

*Primary Examiner*—Donald J. Loney
*Attorney, Agent, or Firm*—Robert L. Broad, Jr.; Guy M. Miller; Alan J. Kennedy

[57] ABSTRACT

A structural panel assembly has a bi-directional core structure sandwiched between and secured to a pair of outer side wall members. The core structure is formed from first and second perpendicular series of elongated strip members having crenelated configurations. The strip members in the first series thereof are transversely interwoven with the strip members in the second series thereof in a manner such that crest portions of the strip members in the first series overlie and oppose trough portions of the strip members in the second series, and trough portions of the strip members in the first series underlie and oppose crest portions of the strip members in the second series. The crest portions of all of the strip members lie generally in a first plane and are secured to the inner side of one of the panel assembly outer side walls, and the trough portions of all of the strip members lie generally in a second plane and are secured to the inner side of the other panel assembly outer side wall.

12 Claims, 2 Drawing Sheets

SANDWICHED STRUCTURAL PANEL HAVING A BI-DIRECTIONAL CORE STRUCTURE

ORIGIN OF THE INVENTION

The invention described herein was made by an employee of the United States Government and may be manufactured and used by or for the Government for Government purposes without the payment of any royalties thereon or therefor.

BACKGROUND OF THE INVENTION

1. Field of the Invention

The present invention relates generally to structural panel members, and more particularly relates to sandwiched core type structural panel assemblies.

2. Description of Related Art

Structural panels are often formed in a sandwich configuration in which a core structure is sandwiched between and secured to a pair of outer side wall or face sheet members. Previous core structures include (1) honeycombed cores made from metal, cardboard or reinforced plastic, (2) corrugated cores such as those used in cardboard and similar panels made of metal, and (3) solid cores made of low density material such as styrofoam or balsa wood.

In addition to being relatively expensive to fabricate, conventional honeycombed cores have the primary disadvantage of meeting the opposing face sheets with only the thin side edges of the core. These thin side edges are difficult to bond to the face sheets, and it is normally difficult to verify the quality and uniformity of the resulting thin bond lines.

Corrugated cores are cheaper to manufacture, but can resist shear loads only along their corrugations. This makes the panel in which they are incorporated relatively weak in the transverse direction.

Solid cores can absorb water and other substances that can add undesirable weight to the overall panel assembly and/or damage it. Additionally, solid cores are often prone to cracking due to stresses generated by thermal strain differences with their associated face sheets.

In view of the foregoing it can be seen that a need exists for an improved core structure for use in a sandwiched core type structural panel. It is accordingly an object of the present invention to provide such an improved core structure.

SUMMARY OF THE INVENTION

In carrying out principles of the present invention, in accordance with a preferred embodiment thereof, an improved structural panel is provided, the panel comprising a specially designed bi-directional core structure sandwiched and secured between a pair of outer side wall members.

The bi-directional core structure is formed from first and second perpendicular series of elongated rectangular strip members. Each individual strip member is transversely bent to form, along its length, alternating crests and troughs each defined by a longitudinally spaced pair of opposite side walls transverse to the length of the strip member, and an outer end wall transverse to the opposite strip member side walls. These strip member side walls may be stiffened by forming corrugations therein that extend transversely to the strip member length.

The crenelated strip members in each of the perpendicular first and second series thereof are disposed in a longitudinally parallel, side edge-by-side edge array in which, for each laterally adjacent pair of strip members, the crests of one strip member are longitudinally aligned with the troughs of the other strip member.

According to a feature of the present invention, the first and second series of crenelated strip members are transversely interwoven with one another in a manner such that:

1. The outer crest end walls of the strip members in the second series thereof overlie and oppose the outer trough end walls of the strip members in the first series thereof;
2. The outer trough end walls of the strip members in the second series thereof underlie and oppose the outer crest end walls of the strip members in the first series thereof;
3. The outer crest end walls of the strip members in the first and second series thereof lie generally in a first plane and combinatively define a first side of the core structure which is secured to the inner side of one of the panel assembly outer side walls; and
4. The outer trough end walls of the strip members in the first and second series thereof lie generally in a second plane and combinatively define a second side of the core structure which is secured to the inner side of the other panel assembly outer side wall.

In the completed panel assembly, the bi-directional core structure contacts virtually all of the inner side surface area of the outer side wall members, thereby maximizing the available securement area between the core structure and the outer side wall members. The securement of the outer side wall members to the core structure may be effected by an adhesive bonding material, mechanical fasteners or by welding as desired.

Bending loads applied to the panel assembly result in predominately normal stresses (i.e., tension and compression) in the outer side walls, and predominately shear stresses in the core structure. The core structure also serves to reinforce the outer side walls of the panel assembly, preventing compression loads from buckling the outer panel side walls.

When the crenelated strips used to form the core structure have identical configurations, the core structure is equally stiff in two perpendicular directions parallel to the outer side walls of the panel assembly. Alternatively, the core structure could be formed with the strips in one of the two perpendicular series thereof being wider than the strips in the other series thereof to thereby give the panel assembly a stiffness in one direction greater than the stiffness in the other direction perpendicular thereto.

DETAILED DESCRIPTION

Figure 1:
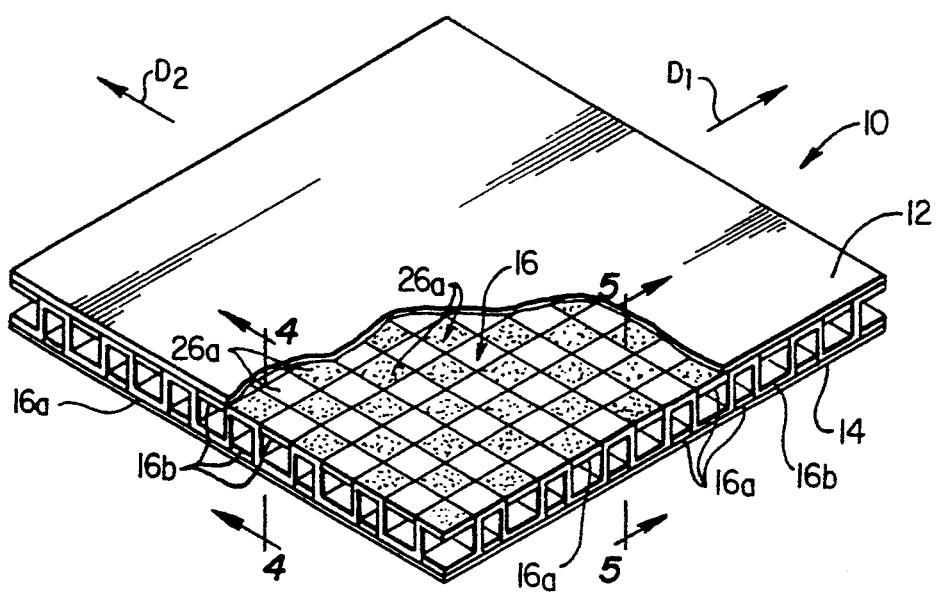
FIG. 1 is a partially cut away perspective view of a sandwich type structural panel assembly incorporating therein a bi-directional core structure embodying principles of the present invention.

Perspectively illustrated in FIG. 1 is a sandwiched core type structural panel assembly 10 that includes a pair of rectangular top and bottom metal outer side walls or face sheets 12 and 14 disposed in a spaced apart, parallel and opposing relationship. Sandwiched between and secured to the outer side walls 12,14 is a specially designed metal bi-directional core structure 16 that embodies principles of the present invention.

Figure 2:
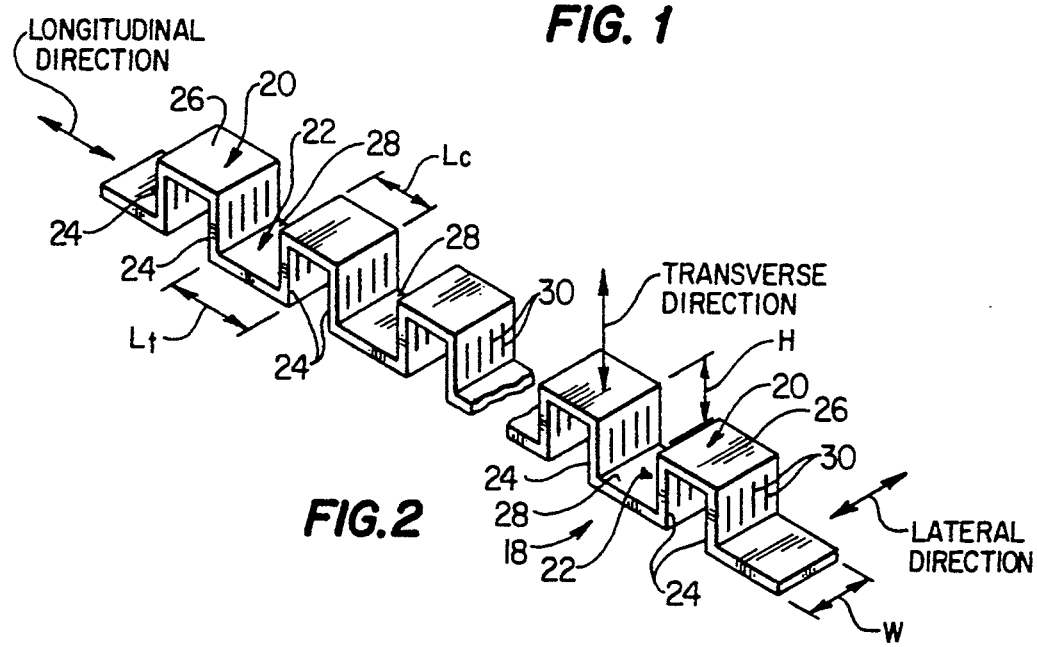
FIG. 2 is an enlarged scale, longitudinally foreshortened perspective view of one of a series of elongated crenelated strip members used to form the core structure.

The basic building block of the core structure 16 is an elongated rectangular metal strip member 18 perspectively illustrated in a longitudinally foreshortened form in FIG. 2. Strip 18 has a crenelated configuration created by transversely bending the strip to form, along its length, longitudinally alternating rectangular crests 20 and troughs 22.

Each crest 20 has a height H and is defined by a longitudinally spaced pair of side walls 24 extending transversely to the length of the strip 16, and an outer end wall 26 extending transversely between the upper ends of the pair of side walls 24. In turn, each trough 22 is defined by an opposing pair of the strip side walls 24 and an outer end wall 28 extending transversely between such side walls.

The longitudinal distance $L_c$ between each opposing pair of crest side walls 24, and the longitudinal distance $L_t$ between each opposing pair of trough side walls 24, are each generally equal to the lateral width W of the strip 18. To stiffen the strip side walls 24, a series of vertical corrugations 30 may be suitably formed thereon.

Figure 3:
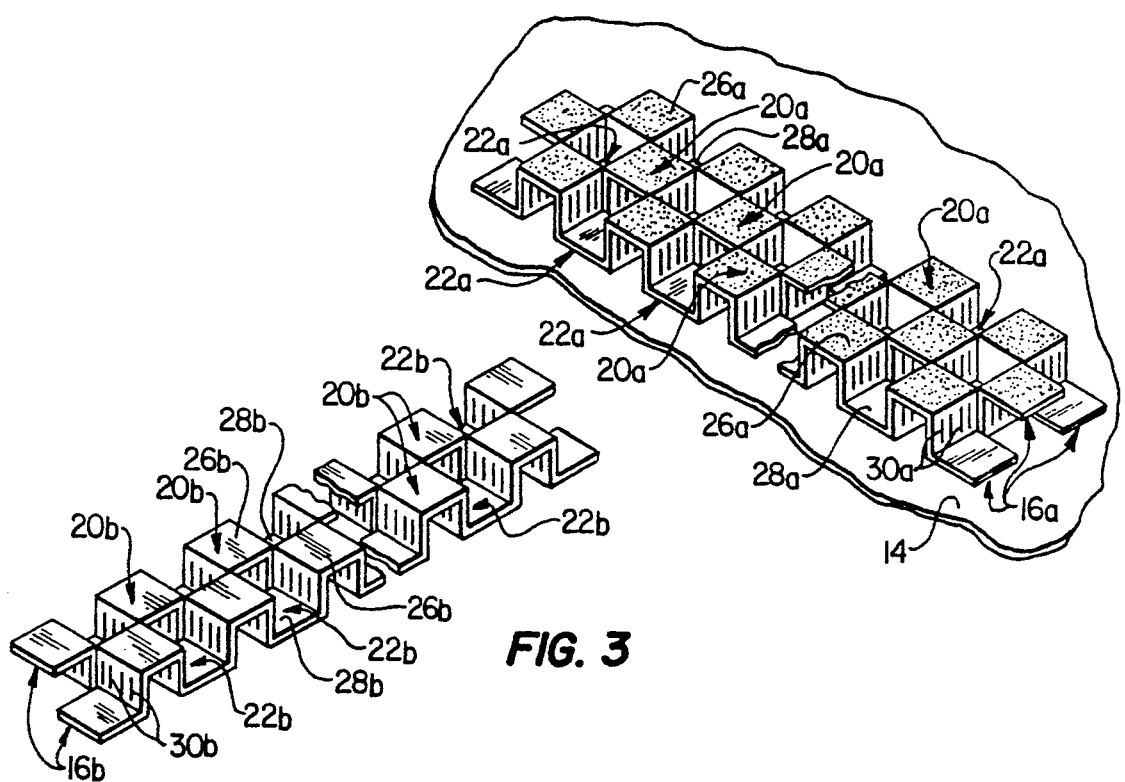
FIG. 3 is an enlarged scale, longitudinally foreshortened perspective view of some of the strip members arranged in two perpendicular series thereof for the formation of the core structure.

Turning now to FIG. 3, to construct the bi-directional core 16, a first series of strips 16a (only three of which are shown) are placed, trough side down, on the top side of the bottom panel assembly side wall 14 in a longitudinally parallel, side edge-by-side edge array in which, for each laterally adjacent pair of strips 16a, the crests 20a of one strip are longitudinally aligned with the troughs 22a of the other strip.

Figure 4:
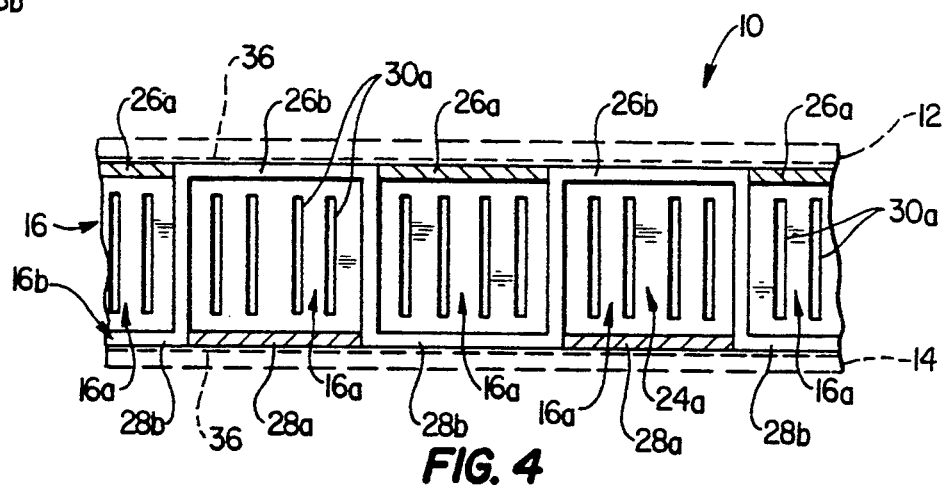
FIGS. 4 and 5 are enlarged scale partial cross-sectional views through the panel assembly taken respectively along lines 4—4 and 5—5 of FIG. 1 and illustrating the manner in which the two perpendicular series of strip members are transversely interwoven with one another to form the core structure.
Figure 5:
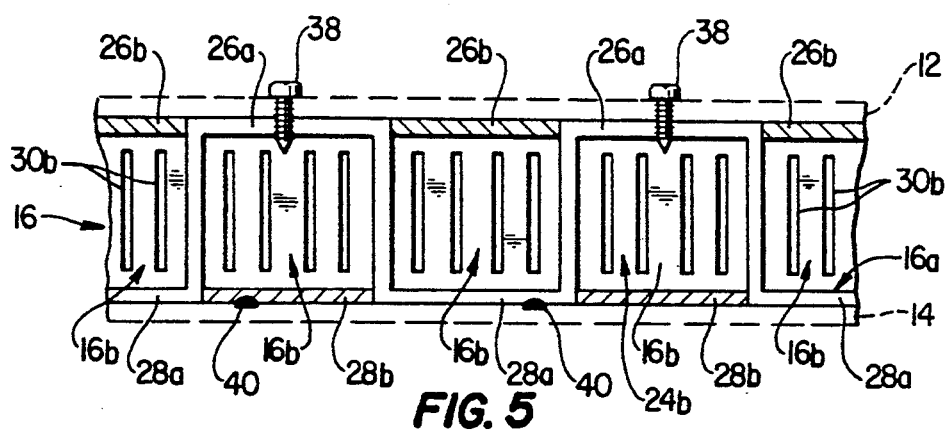

Referring now to FIGS. 3–5, a second series of strips 16b (only two of which are shown in FIG. 3) are transversely interwoven with the array of strips 16a in a manner such that, as cross-sectionally illustrated in FIGS. 4 and 5, the outer crest end walls 26b of the strips 16b overlie and oppose the outer trough end walls 28a of the strips 16a; the outer trough end walls 28b of the strips 16b underlie and oppose the outer crest end walls 26a of the strips 16a; the outer crest end walls 26a,26b of the strips 16a,16b lie in a common plane parallel to and spaced upwardly apart from the bottom panel assembly side wall 14; and the outer trough end walls 28a,28b lie in a common plane contiguous with the side wall 14.

Figure 6:
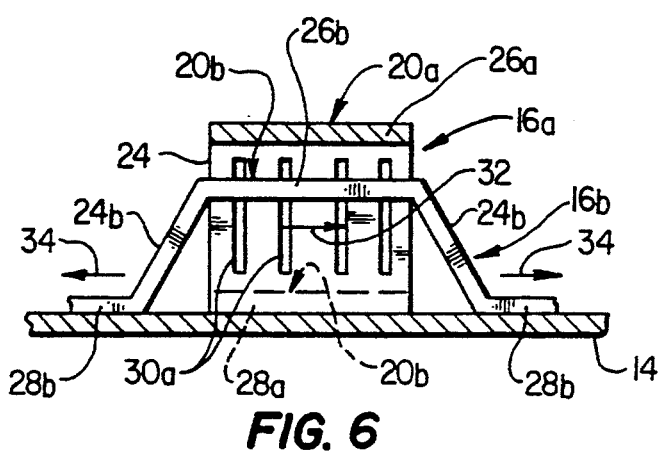
FIG. 6 is a cross-sectional view through one of the strip members illustrating the manner in which a perpendicular strip member may be longitudinally passed through a crest portion thereof in the strip interweaving process.

The strips 16b may be transversely interwoven with the series of strips 16a simply by longitudinally passing each of the strips 16b alternatively over and under the transverse strips 16a. As shown in FIG. 6, as each strip 16b is being transversely woven through the transverse strips 16a (as indicated by the arrow 32 in FIG. 6) it may be longitudinally pulled (as indicated by the arrows 34) to lower its outer crest end walls 26b and thereby facilitate the passage of the outer crest end walls 26b beneath the outer crest end walls 26a of the strips 16a.

In the resulting transversely interwoven bi-directional core structure 16 (see FIG. 1), the outer crest end walls 26a,26b (like the outer trough end walls 28a,28b on the lower side of the core structure 16) are arranged in a checkerboard pattern relative to one another. To more clearly illustrate this pattern, and to visually distinguish the strips 16a from the strips 16b in the assembled core structure 16 shown in FIG. 1, the top end surfaces of the outer crest end walls 26a have been stippled in FIGS. 1 and 3, and the side and end edge surfaces of the strips 16a have been darkened in FIG. 1.

The outer end surfaces of the outer crest end walls 26a,26b combinatively define an upper side surface of the core structure 16 that has a total area generally equal to the inner side surface area of the top panel assembly side wall 12. In a similar manner, the outer end surfaces of the outer trough end walls 28a,28b combinatively define a lower side surface of the core structure 16 that has a total area generally equal to the inner side surface area of the bottom panel assembly side wall 14.

Compared to conventional panel core structures having honeycombed or corrugated configurations, this provides the bi-directional core 16 with greatly increased side securement areas to which the panel assembly side walls 12,14 may be attached. In turn, this permits the side walls 12,14 to be fixedly secured to opposite sides of the core 16 in a variety of manners. For example, as representatively shown in FIG. 4, the side walls 12,14 may be bonded to the entire opposite side surfaces of the core 16 using a suitable high strength adhesive material 36. Alternatively, as representatively shown in FIG. 5, mechanical fasteners (such as screws 38) or welds 40 may be used to fixedly secure the side walls 12,14 to the opposite sides of the core structure 16.

Referring now to FIG. 1, the core structure 16 provides the sandwich panel assembly 10 with shear rigidity in two orthogonal directions—direction $D_1$ perpendicular to the strips 16a, and direction $D_2$ perpendicular to the strips 16b. Bending loads applied to the panel result in mostly normal stresses (tension and compression) in the outer side walls 12 and 14, and mostly shear stresses in the core 16. Core 16 also serves to reinforce the side walls 12 and 14, preventing compression loads on the panel from buckling the outer panel side walls.

In the core structure 16 representatively described above, all of the strips 16a,16b are identically sized and configured. Accordingly, the stiffness of the panel 10 in direction $D_1$ is equal to its stiffness in direction $D_2$. If desired, however, the panel stiffness in one of these directions can be made greater than in the other direction simply by making the strips in one of the two perpendicular series thereof narrower then the strips in the other series thereof. To do this, the strips in each direction would be bent to leave about the width of the opposing strip between them, thereby biasing the stiffness of the panel 10 to be greater in one of the directions $D_1$ and $D_2$.

While the panel assembly 10 has been representatively described as being formed from metal, it will be readily appreciated that it could be alternatively formed from other materials if desired.

The foregoing detailed description is to be clearly understood as being given by way of illustration and example only, the spirit and scope of the present invention being limited solely by the appended claims.

What is claimed is:

1. A structural panel assembly comprising:
   first and second outer side wall members disposed in a spaced apart, parallel and opposing relationship and having facing inner side surfaces;
   a bi-directional core structure sandwiched between said first and second outer side wall members and formed from perpendicular, transversely interwoven first and second series of elongated strip members each having a crenelated configuration along its length and a longitudinally alternating series of oppositely facing first and second outer side surface portions, said first and second side surface portions of said strip members combinatively defining first and second parallel, generally planar first and second opposite side surfaces on said core structure; and
   attachment means for respectively securing said first and second opposite side surfaces of said core structure to said inner side surfaces of said first and second outer side wall members.

2. The structural panel assembly of claim 1 wherein said attachment means include:
   layers of adhesive material between said first and second opposite side surfaces of said core structure and said facing inner side surfaces of said first and second outer side wall members.

3. The structural panel assembly of claim 1 wherein:
   said attachment means include mechanical fastening members extending through said first and second outer side wall members and into the opposite sides of said core structure.

4. The structural panel assembly of claim 1 wherein:
   said attachment means include weld joints formed between said facing inner side surfaces of said first and second outer side wall members and said first and second opposite side surfaces of said core structure.

5. The structural panel assembly of claim 1 wherein:
   the total area of said first side surface of said core structure is generally equal to the area of the inner side surface of said first outer side wall member, and
   the total area of said second side surface of said core structure is generally equal to the area of the inner side surface of said second outer side wall member.

6. The structural panel assembly of claim 1 wherein:
   all of said elongated strip members are substantially identically configured.

7. The structural panel assembly of claim 1 wherein:
   the widths of the elongated strip members in one of said first and second series thereof are narrower than the widths of the elongated strip members in the other of said first and second series thereof.

8. A structural panel assembly having first and second generally planar outer side wall members disposed in a spaced apart, parallel and opposing relationship, and a bi-directional core structure sandwiched between said first and second outer side wall members and having first and second opposite sides respectively secured to said first and second outer side wall members, said bi-directional core structure comprising:
   first and second series of elongated rectangular strip members each transversely bent to form, along its length, alternating crests and troughs each defined by a longitudinally spaced pair of opposite side walls transverse to the length of the strip member, and an outer end wall transverse to the opposite strip member side walls,
   the strip members in each of said first and second series thereof being disposed in a longitudinally parallel, side edge-by-side edge array in which, for each laterally adjacent pair of strip members, the crests of one strip member are longitudinally aligned with the troughs of the other strip member, and
   said first and second series of strip members being transversely interwoven with one another in a manner such that the outer crest end walls of the strip members in said second series thereof overlie and oppose the outer trough end walls of the strip members in said first series thereof, the outer trough end walls of the strip members in said second series thereof underlie and oppose the outer crest end walls of the strip members in said first series thereof, the outer crest end walls of the strip members in said first and second series thereof lie generally in a first plane and combinatively define said first side of said bi-directional core structure, and the outer trough end walls of the strip members in said first and second series thereof lie generally in a second plane and combinatively define said second side of said bi-directional core structure.

9. The structural panel assembly of claim 8 wherein:
   the total outer end surface area of said crests is generally equal to the inner side surface area of said first outer side wall member, and
   the total outer end surface area of said troughs is generally equal to the inner side surface area of said second outer side wall member.

10. The structural panel assembly of claim 9 wherein:
    the elongated strip members in said first and second series thereof have generally identical configurations.

11. The structural panel assembly of claim 9 wherein:
    the widths of the elongated strip members in one of said first and second series thereof are smaller than the widths of the elongated strip members in the other of said first and second series thereof.

12. The structural panel assembly of claim 8 wherein:
    said side walls of said elongated strip members in said first and second series thereof have stiffening corrugations formed therein and extending generally transversely to the lengths of the strip members.

* * * * *